May 6, 1958     E. LAKATOS ET AL     2,833,471

COMPUTING SYSTEM AND METHOD

Filed June 4, 1946     6 Sheets—Sheet 1

INVENTORS: E. LAKATOS
H. G. OCH
BY

D. MacKenzie
AGENT

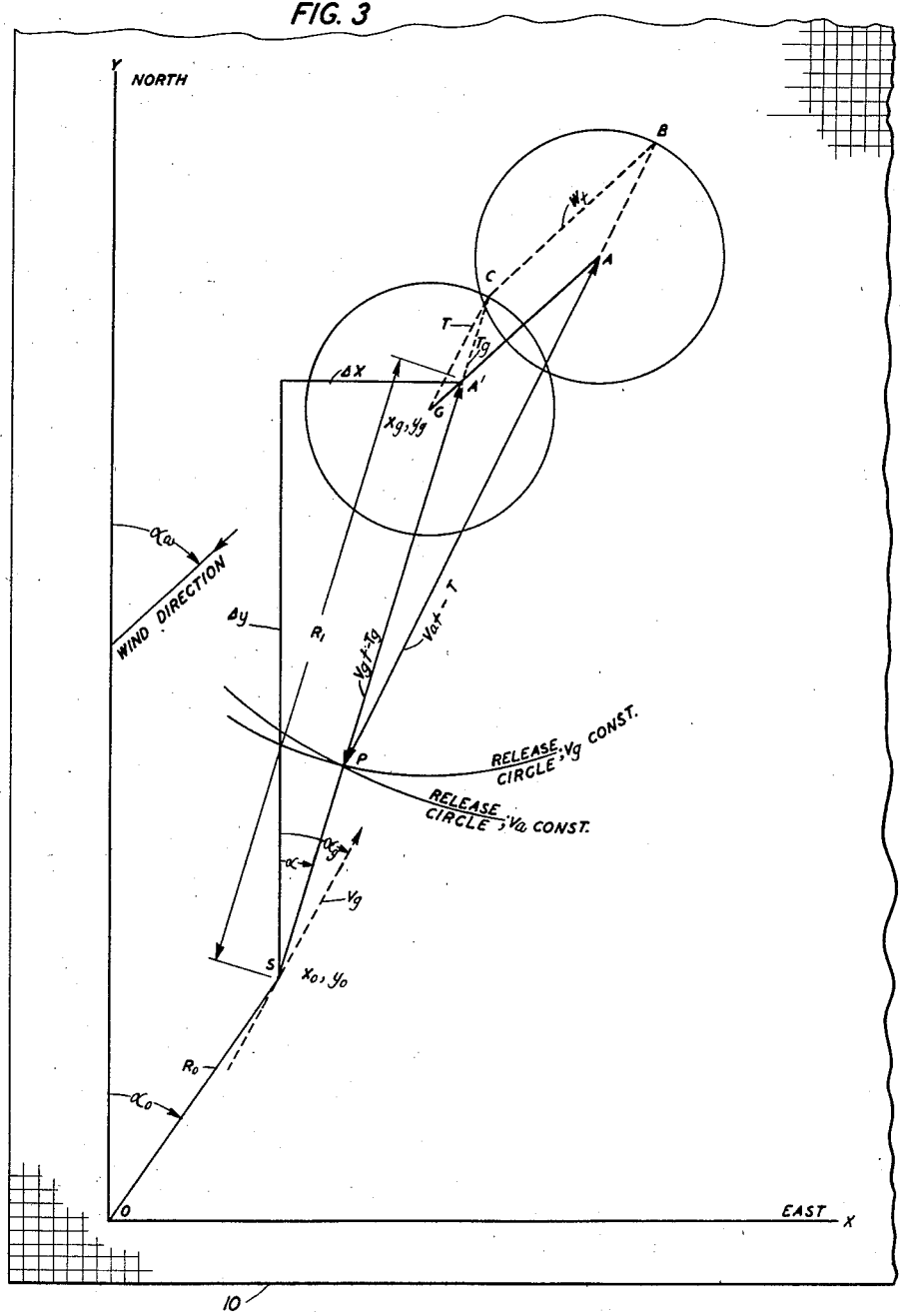

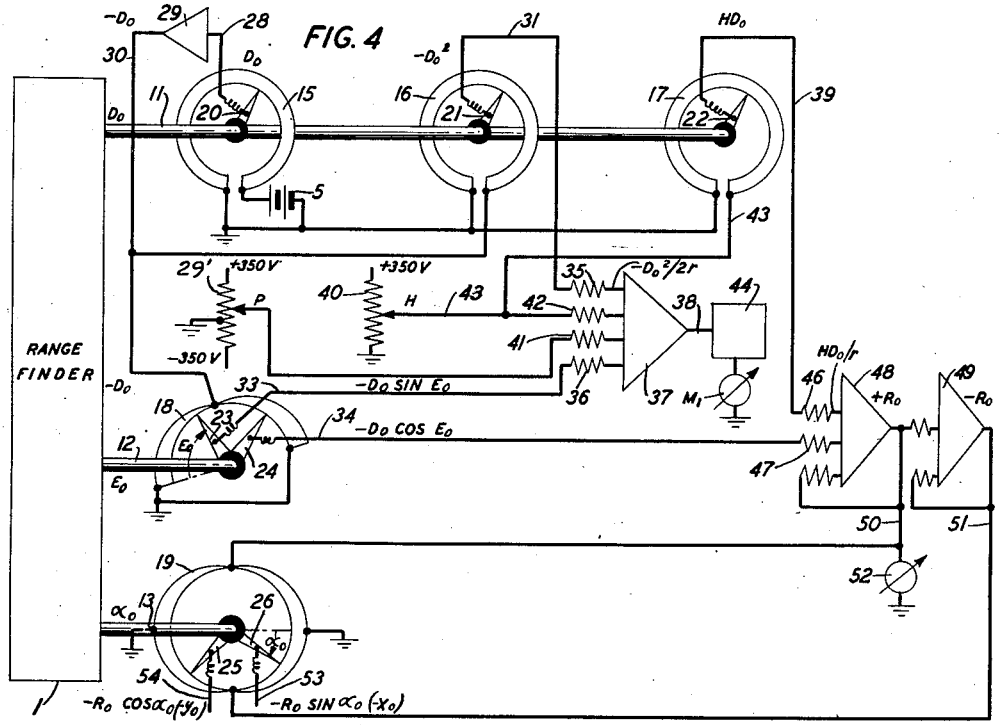
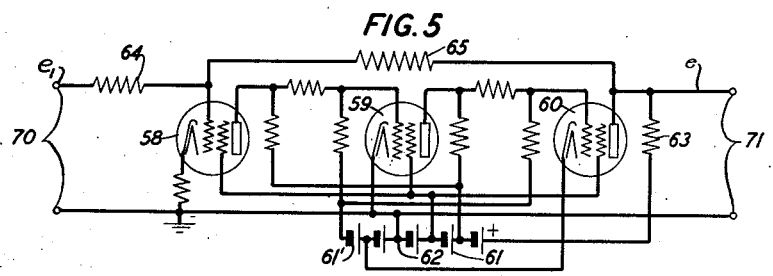
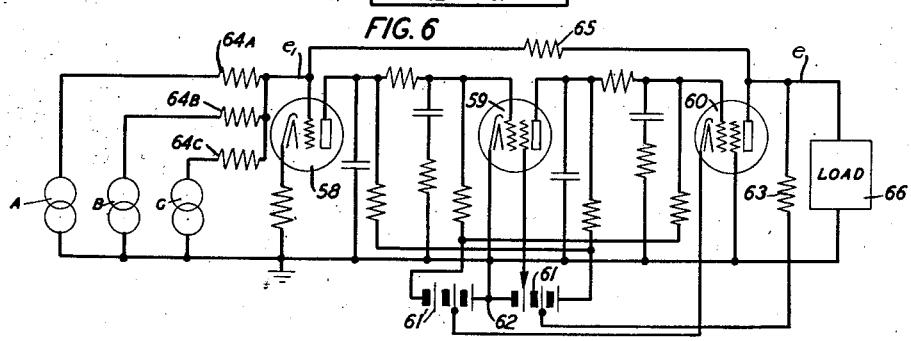

May 6, 1958  E. LAKATOS ET AL  2,833,471
COMPUTING SYSTEM AND METHOD
Filed June 4, 1946  6 Sheets-Sheet 4

INVENTORS. E. LAKATOS
H. G. OCH
BY
AGENT

May 6, 1958 E. LAKATOS ET AL 2,833,471
COMPUTING SYSTEM AND METHOD
Filed June 4, 1946 6 Sheets-Sheet 6
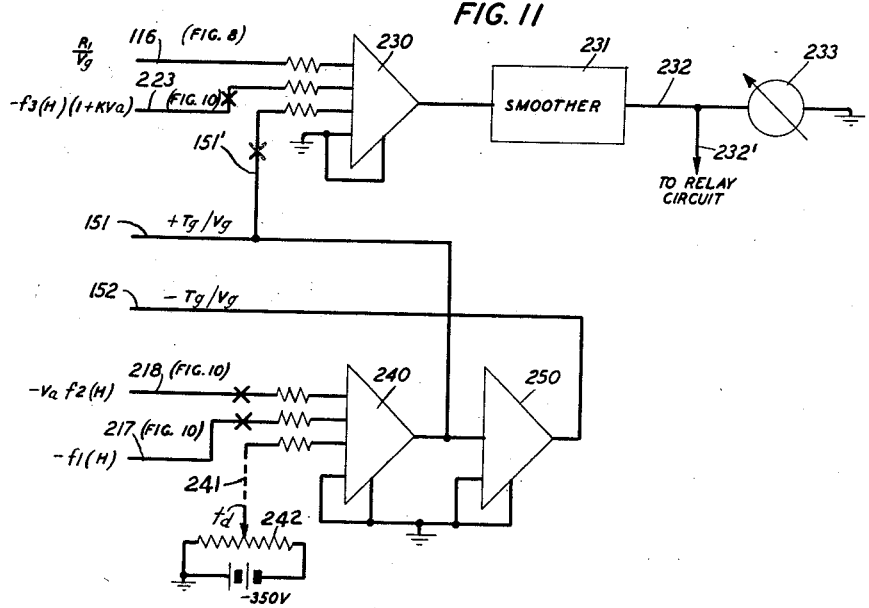
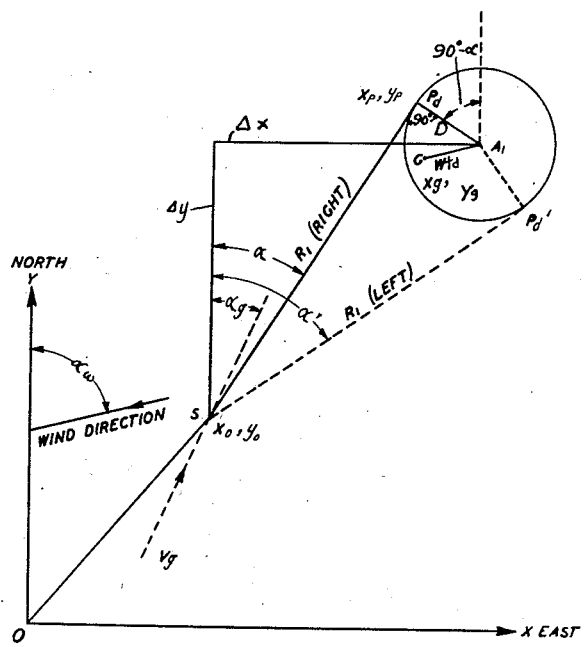
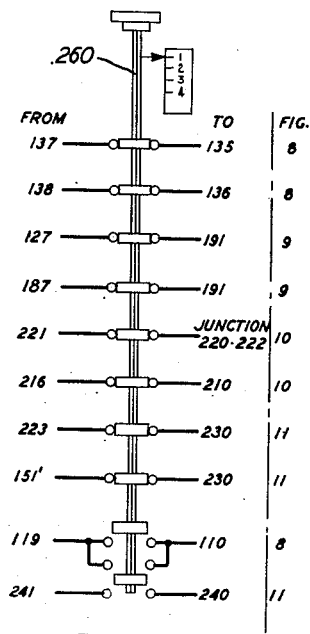
INVENTORS. E. LAKATOS
H. G. OCH
BY
D. MacKenzie
AGENT

United States Patent Office 2,833,471
Patented May 6, 1958

2,833,471

COMPUTING SYSTEM AND METHOD

Emory Lakatos, Cranford, and Henry G. Och, Short Hills, N. J., assignors to Bell Telephone Laboratories, Incorporated, New York, N. Y., a corporation of New York Application June 4, 1946, Serial No. 674,338

8 Claims. (Cl. 235—61.5)

This invention relates to an improved method and system for computing from ground observations the information required to guide the flight of an airplane with reference to a distant point the location of which is known to the ground observer. The invention is particularly useful when the airplane to be guided is not itself provided with means for observing the reference point, which may be either a target to be attacked, a desired destination or an obstacle to be avoided.

An object of the invention is therefore to provide a system of apparatus comprising known elements, electrical and mechanical, in a novel organization adapted to the automatic solution of the problems of ground control of airplanes for warlike or peaceful purposes.

It is another object of the invention to provide an improved method for the solution of such problems.

The electrical circuit of the invention includes switching means whereby the system is readily enabled to solve any one of four types of problems, namely, (a) bombing a target by dropping a bomb from an airplane above the target; (b) diving attack upon a target; (c) guiding an airplane to pass directly over a desired point; or (d) guiding the plane to pass a known point at a desired distance horizontally abeam. To provide a computing system of this flexibility in organization is therefore another object of the invention.

It may be desired merely to compute the present course and speed of the airplane with reference to the surface of the earth. The system presently described includes means for making automatically such a computation, and to provide such means is also an object of the invention.

Another object of the invention is attained by the provision of means for the automatic indication of the time of flight from the position of the airplane when observations begin to the position appropriate for releasing a bomb or for starting to dive toward the target, or to the position where a known point is either directly below the plane or at a desired horizontal distance at right angles to the line of flight.

While the invention will be described as applied to the ground control of airplane flight, it will be obvious that the control of surface craft is also possible.

The pilot of the airplane will be assumed provided with means of communication by voice or code with the ground observer and with the usual navigational aids at least to the extent necessary to maintain a constant altitude and to fly a prescribed course, as well as means for executing a dive or for launching a bomb when the plane's mission is attack upon a target. Level flight is understood.

The ground observer will be understood to know from a map the positions and elevations of the target or reference point and of his own station, and to be equipped with optical or electrical means for continuously observing slant range, elevation and bearing of the airplane relative to the point of observation. Also knowledge by the observer of the speed and direction of the wind will be assumed. In all cases horizontal angles such as bearing, will be counted east of north.

The invention itself will be understood from the following description read with reference to the accompanying drawings, in which:

Fig. 3 shows in horizontal projection the courses, speeds and distances to be computed in guiding a bombing plane;

Fig. 4 is a schematic of the circuit for continuously resolving into vertical and horizontal components the slant range from ground observer to the plane;

Figs. 5 and 6 are diagrams of the circuits of polarity reversing and of summing amplifiers used in the system of the invention;

Fig. 11 is a diagram of the circuit for continuously indicating the time of flight remaining before reaching the point of bomb release or of dive;

Fig. 12 shows in horizontal projection the geometry of dive attack on the target; and Fig. 13 shows illustrative 4-position switching means and the connections thereby made for the solutions of the several control problems.

In all figures, like elements are indicated by like numerals or letters. Conventional power supplies and switches for energizing the system are understood but not shown.

Figure 1:
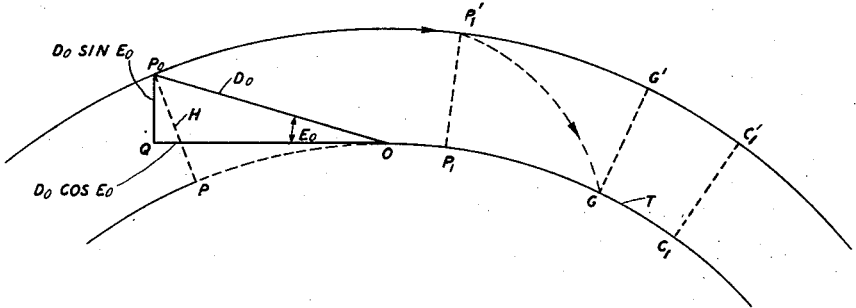
Figs. 1 and 2 are respectively vertical and horizontal projections of the flight of an airplane intending to bomb a target below.

Referring now to Fig. 1, the attacking airplane at $P_0$ is considered to fly the actual course $P_0C_1'$, allowance being made for the wind. At $P_1'$ a bomb is released to strike the ground target G. At the beginning of the attack, a ground observer at O notes the slant range $D_0$ and the angle of elevation $E_0$ of the sight line to the airplane. The earth's surface is represented by the arc $PP_1C_1$, and the flight of the plane at constant altitude by the arc $P_0P_1'C_1'$.

The observations of slant range and elevation give neither the true altitude H nor the true ground distance PO from the observer to the surface point P directly beneath the plane at the moment of observation. Such a surface point may be referred to as a "subplanar" point. If $r$ is the radius of the earth, the true altitude $$H = PP_0 = D_0 \left( \sin E_0 + \frac{D_0}{2r} \right)$$

approximately, and the true ground distance $$PO = D_0 \left( \cos E_0 - \frac{H}{r} \right)$$

approximately. The plane, if it continues on the same course after releasing the bomb, will reach the point $C_1'$, at the instant the bomb strikes at G. The ground distance $P_1C_1$ is somewhat less than the distance $P_1'C_1'$ actually flown by the plane with ground speed $V_g$ in the time $t$ of bomb fall. The difference $$P_1'C_1' - P_1C_1 = P_1C_1 \frac{H}{r}$$

if in miles $P_1C_1 = 10$, $H = 5$ and $r = 4000$, the difference is 66 feet. This distance is covered in 0.15 second by a plane flying 300 miles per hour. No allowance for this difference is necessary for the reason that the ballistic tables for the bomb express the trail T as the distance on the ground between the point of impact and the subplanar point at the instant of impact and the attack is guided with reference to a surface plot.

Figure 2:
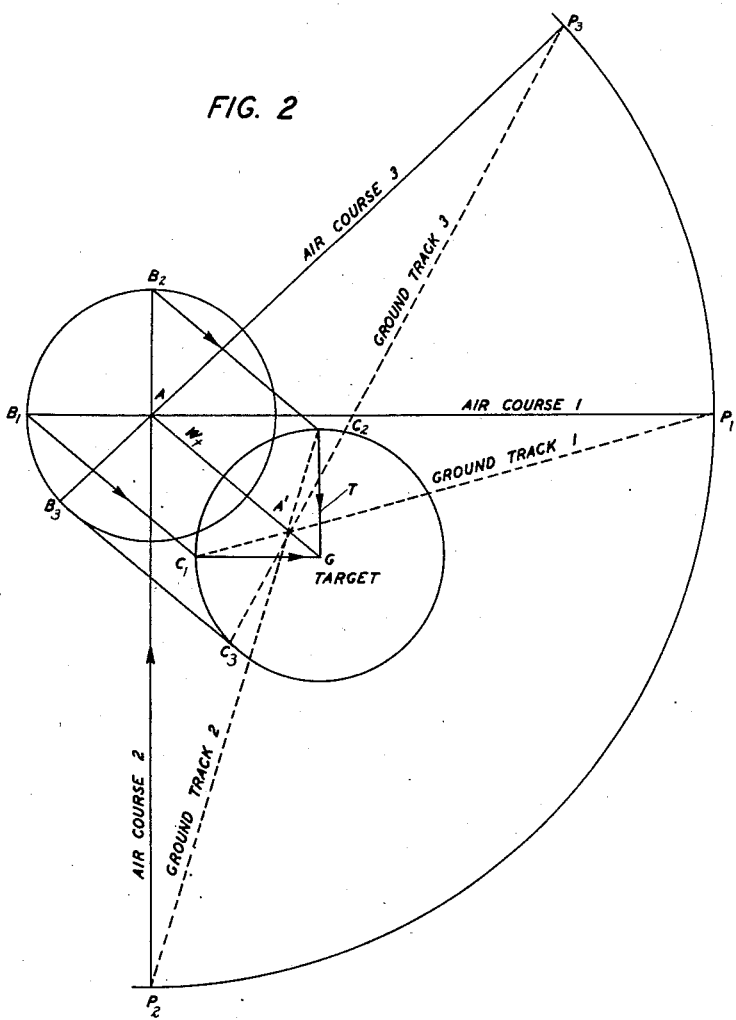

Fig. 2 shows in ground projection three illustrative attacks. Circle $C_1C_2$ is drawn with radius T about G as center; circle $B_1B_2$ with the same radius about A, where AG is the windage during the fall of the bomb. In one attack the plane flies on the heading $P_1B_1$ through the release point $P_1$ over a distance $P_1B_1 = V_a t$, where $V_a$ is the plane's airspeed and $t$ is the time of bomb fall from the point $P_1'$ above $P_1$. The wind is considered to blow in the direction $B_1C_1$ with speed W, so that the plane's windage in time $t$ is $B_1C_1 = Wt$. Trail of the bomb is directly astern of the plane through the distance $T = C_1G$, and the bomb strikes the target at G when the plane is over the point $C_1$, assuming no change of heading after bomb release. A similar projection of another attack on a heading $P_2B_2$ approximately at right angles to the first makes it clear that for the same altitude and airspeed the release heading must, for any attack, pass through the point A, upwind from the target by the distance $AG = Wt$ and that the release point must lie on a circle of radius $V_a t - T$ drawn about A as its center.

Inspection of the diagram of Fig. 2 shows also that the ground tracks in the two illustrative attacks intersect at a point A' on the line AG. Construction of other attacks such as $P_3B_3$ exhibits the same feature for all, and the point A' is an aiming point for the ground course. Considering the attack along $P_1AB_1$, we see that $$\frac{P_1A}{P_1B_1} = \frac{AA'}{B_1C_1}$$

Since $P_1B_1 = V_a t$ and $B_1C_1 = AG = Wt$, we have $$A'G = W \cdot \frac{T}{V_a}$$

fixing the point A' upwind by this distance from the target at G, as a ground point through which must pass the ground tracks of all successful attacks on G for the assumed airspeed and altitude of the attacking plane. It will be noted that the ground distances from the release points to the ground aimpoint are not the same.

The release points $P_1$, $P_2$, etc. are points on the ground and lie on a circle of radius $V_a t - T$ about the center A. The position of the point A' is, for given W, T and $V_a$ independent of the direction of attack and is distant $A'P_1$ from a release point such as $P_1$. From the similar triangles $P_1B_1C_1$ and $P_1AA'$, it is seen that $$A'P_1 = V_g \left(t - \frac{T}{V_a}\right)$$

where $V_g$ is the ground speed of the plane, since $$\frac{A'P_1}{AP_1} = \frac{C_1P_1}{B_1P_1}$$

and $AP_1 = V_a t - T$, $B_1P_1 = V_a t$ and $C_1P_1 = V_g t$. For any ground speed $V_g$ at a subplanar point $P_1$, the plane's ground course must be directed through A' and the point $P_1$ must be distant from A' by $$V_g \left(t - \frac{T}{V_a}\right)$$

if $P_1$ is to be a proper release point. The airspeed $V_a$ may be learned from the pilot of the attacking plane; it is also computed by the system of the invention.

The time of fall $t$ is a function of altitude H, varying only slightly with $V_a$, while the trail T is a function of both H and $V_a$. T and $t$ are obtained from ballistic tables for the type of bomb to be dropped. A further construction, not necessary to be shown here, indicates that while the release circle for constant airspeed is centered at A, Figs. 2 and 3, the release circle for constant ground speed is centered at A' with radius $$V_g \left(t - \frac{T}{V_a}\right)$$

or $V_g t - T_g$. It is noted that while the expression for the release ground distance $A'P_1$, Fig. 2, does not explicitly involve the wind, it is necessary to know in advance wind speed and direction to plot the point A'. Also it is found convenient to express the distance A'G as $$W \frac{T_g}{V_g}$$

where $$T_g = A'C = T \frac{V_g}{V_a}$$

This appears from inspection of the similar triangles $P_1B_1C_1$ and $P_1AA'$ in Fig. 2.

In any practical case, the attacking plane will be moving on a course approximately that required for successful bombing and the ground speed, determined from the the initial observations will be the same as on the final course. As will presently appear, it is not necessary to obtain airspeed $V_a$ from the plane itself. The azimuth $\alpha$ east of north of the correct bombing course, as well as ground speed $V_g$, will be found from the computer. The wind is known in direction $\alpha_\omega$ and speed W and the airspeed is given to a good approximation by $V_a = V_g + W \cos(\alpha_\omega - \alpha)$. Since the cosine only appears in this equation, it is immaterial whether the angle is taken as $(\alpha_\omega - \alpha)$ or $(\alpha - \alpha_\omega)$.

Fig. 3 illustrates the ground projection of an attack, referred to an origin O, which is the observer's position on map 10. From the range finding equipment the observer finds the slant range $D_0$ and the map direction $\alpha_0$ of the plane above S. From the map, the position G of the target and the difference in elevation of target and observer are known and the system of the invention determines the required distances and directions. These are: the azimuth $\alpha_g$ of the initial course; $\alpha$, that of the correct bombing course; $\alpha_g - \alpha$, the required change of course; $R_1$, the distance from S to the ground track aimpoint A'; $t_r$, the time to fly on the correct ground track from S to the release point P; and airspeed, $V_a$. The last quantity is required for the computation of $t_r$ and of $$\frac{T_g}{V_g}$$

which is involved in finding $t_r$ and $\alpha$.

From inspection of Fig. 3, it is seen that the components of A'G are $$W \frac{T_g}{V_g} \sin \alpha_\omega$$

along x and $$W \frac{T_g}{V_g} \cos \alpha_\omega$$

along y. The map coordinates of S and G being $x_0$, $y_0$ and $x_g$, $y_g$, respectively, the x and y components of $R_1$ are $$\Delta x = x_g - x_0 + W \frac{T_g}{V_g} \sin \alpha_\omega$$

and $$\Delta y = y_g - y_0 + W \frac{T_g}{V_g} \cos \alpha_\omega$$

The coordinates $x_0$ and $y_0$ are those given by resolution of the range finder data. The position of the plane is continually varying and the observations of the varying position are affected by tracking errors and so need to be smoothed for satisfactory use. Smoothing circuits for $x_0$, $y_0$ and their time derivatives, and for altitude H are described later.

In Fig. 4, range finder 1 is assumed to provide slant range $D_0$, elevation angle $E_0$, and azimuth $\alpha_0$ of the plane first observed at a point vertically above S, Fig. 3. The quantities observed are given as angular positions of shafts 11 for $D_0$, 12 for $E_0$ and 13 for $\alpha_0$. Shaft 11 rotates brushes 20, 21 and 22 over potenticmeters 15, 16 and 17, respectively, which are all circular cards with linear windings concentric with shaft 11, an end of each winding being grounded. Shaft 12 rotates brushes 23 and 24 over semicircular potentiometer card 18, the winding of which has a resistance per turn varying as the sine of the angle from its mid-point to the end of each quadrant, where the winding is grounded. Shaft 13 rotates brushes 25 and 26 over circular potentiometer card 19 of which the winding has a resistance per turn varying as the sine of the angle between points on the opposite ends of a diameter. To these points are connected a pair of voltages, while the mid-points of each half of the winding are grounded. All brushes are suitably insulated from the shafts which carry them.

A direct current source 5 of convenient voltage is connected across potentiometer 15 and from brush 20 conductor 28 supplies a voltage proportional to $D_0$ to a polarity reversing amplifier 29 providing on its output a voltage $-D_0$ which is applied to the ungrounded end of potentiometer 16 and to the mid-point of potentiometer 18. Conductors 33 and 34 therefore take from potentiometer 18 the voltages $-D_0 \sin E_0$ and $-D_0 \cos E_0$, respectively. The voltage $-D_0 \sin E_0$, representing the vertical component of the slant range, must be added to the corrections for earth curvature and for the difference in elevation of target and observer, thereby to obtain a voltage proportional to the bombing height of the plane with reference to the target.

Accordingly, the voltage $-D_0^2$ is supplied via conductor 31 through resistor 35 to the input of summing amplifier 37. To this input are supplied also voltages $-D_0 \sin E_0$ and a voltage $p$ representing the elevation difference already referred to; voltage $p$ is obtained from a tap on linear potentiometer 29', grounded at its midpoint and connected at its ends to positive and negative voltages each 350 volts, for example. The tap position is set by hand in accordance with map information and voltage $p$ is positive if the target is higher than the observer, negative, if lower. Illustrated is the case where the target is higher and the input voltages $-D_0 \sin E_0$ and $p$ are supplied through resistors 36 and 41, respectively. The three voltages so far described represent $-D_0 \sin E_0$, $-D_0^2/2r$ and $p$, their sum being $-H$. A positive input voltage from potentiometer 40 through resistor 42 is taken by a handset tap so as to balance the sum of the other voltages, thus making zero the output voltage of amplifier 37 on conductor 38 which is connected to ground through smoothing circuit 44 and meter $M_1$. Smoothing is needed because of errors in tracking the nominally constant altitude of the plane.

The arrangement described in the paragraph just preceding permits the observer to adjust the tap on potentiometer 40 to balance to zero the reading of meter $M_1$, so that by conductor 43 the voltage H is applied to the ungrounded end of potentiometer 17. Then by conductor 39 a voltage $HD_0$ is taken from brush 22; this voltage divided by $r$ is the curvature correction to be subtracted from the horizontal component of slant range to find the ground distance $R_0$ from observer at $o$ to subplanar point S. The voltage $HD_0$ on conductor 39 is summed with that on conductor 34, $-D_0 \cos E_0$, by summing amplifier 48. Resistances 46 and 47 are respectively in series with these voltages, the value of resistance 46 being chosen in such relation to that of resistance 47 that the total input voltage to amplifier 48 is proportional to $$\frac{HD_0}{r} - D_0 \cos E_0$$

just as the value of resistance 35 is chosen in such relation to those of resistances 36, 41 and 42 that the voltage $-D_0^2$ on conductor 31 is effectively divided by $2r$. Where $p$ is not zero, the voltage on conductor 43 approximately represents the height of the airplane vertically above the surface including the target and concentric with that including the observer, while the voltage on conductor 50 approximately represents the length of the great circle on the former surface between earth radii through the airplane and through the observer, respectively. This length is that of PO, Fig. 1, multiplied by the factor $$\left(1+\frac{p}{r}\right)$$

The output voltage of amplifier 48 is reversed in polarity relative to the input voltage $$\frac{HD_0}{r} - D_0 \cos E_0$$

and thus is representative of the corrected map distance $R_0$ from O to S, Fig. 3. Polarity reversing amplifier 49 succeeds amplifier 48 and provides an output voltage $-R_0$. Voltages $+R_0$ and $-R_0$ are applied via conductors 50 and 51, respectively, to the points on potentiometer 19 90 degrees from the grounded points thereof. Brushes 25 and 26 then select, in accordance with the angular position of shaft 13, voltages $-R_0 \cos \alpha_0(-y_0)$ and $-R_0 \sin \alpha_0(-x_0)$, respectively, which are available for smoothing in the computation of $\Delta x$ and $\Delta y$; $-x_0$ on conductor 53, $-y_0$ on conductor 54.

Reversing amplifiers 29 and 49 are of the type shown in Fig. 5, while summing amplifiers 37 and 48 are illustrated in the diagram of Fig. 6. Smoothing circuit 44 may be a simple resistance-capacity filter or may be of the elaborate form shown in Figs. 7A and 7B.

The amplifier of Fig. 5 is used to provide an output voltage of the same magnitude as the input voltage, but with sign reversed. It includes three vacuum tubes 58, 59 and 60, all of high amplification factors, coupled by interstage networks of the type shown in United States Patent 1,751,527 to H. Nyquist, March 25, 1930. A direct current source of voltage such as battery 61, grounded at an intermediate point 62, supplies suitable voltages to the anodes, the control grids and the screen grids of all three vacuum tubes. Cathode heating power, not shown, is understood. Battery 61 is connected at its positive pole through resistor 63 to the anode and at its negative pole to the cathode of tube 60. Additional negative biasing voltage for the control grids of tubes 59 and 60 is furnished by battery 61' in series with battery 61. By proper choice of circuit constants it is arranged that the anode-cathode resistance of tube 60, the resistance of resistor 63 and the two portions of battery 61 form a bridge balanced in the absence of signal on the control grid of tube 60, the anode of that tube being then at ground potential.

If a voltage $e_1$ negative to ground is applied across input terminals 70, making through resistor 64 the potential of the control grid of tube 58 more negative, the potentials of the control grids of tubes 59 and 60 will become less and more negative, respectively, producing a decrease in the anode current of tube 60. Correspondingly, the voltage drop across resistor 63 is reduced and the potential of the anode of tube 60 rises, so that a voltage positive to ground appears at output terminals 71. Stabilization through inverse feedback is effected by the connection of resistor 65 between the anode of tube 60 and the control grid of tube 58. It may be shown that with a high amplification factor for the amplifier the output voltage $e$ equals the negative of the input voltage $e_1$ multiplied by $$\frac{r_1}{r_2}$$

where $r_1$ is the resistance of resistor 65, $r_2$ that of resistor 64. These resistances may be made equal as is done in amplifier 49 of Fig. 4, to make the output voltages of these amplifiers equal in magnitude but opposite in sign to their respective input voltages. It is obvious that amplifiers so designed are direct current amplifiers capable of giving an output voltage following a slowly varying input voltage, with an amplification factor equal to the ratio of feedback resistance (resistor 65) to input resistance (resistor 64) in series with the input voltage. Feedback resistors such as resistor 65 are to be understood in all amplifiers later mentioned.

For a given feedback resistance, the scale of the output voltage is controlled by the input series resistance; doubling the latter halves the output voltage for a given input voltage. It may also be shown that if the connection from the output circuit to feedback resistor 65 is made, not directly from the anode of tube 60, but from a tap on a potentiometer connected between that anode and ground, the voltage between terminals 71 will be numerically $$e = e_1 \frac{r_1 r_3}{r_2 r_4}$$

where $r_3$ is the total resistance of the potentiometer and $r_4$ is the part of that resistance included between ground and the connection to resistor 65. The amplifier of Fig. 5 thus is made a dividing amplifier, $r_4$ being adjusted to be proportional to any quantity by which it is desired to divide the quantity represented by the input voltage $e_1$.

A more elaborate form of interstage network may be used in the summing amplifiers 37 and 48, with a triode as tube 58 in place of the like-numbered tetrode of Fig. 5. The summing amplifier shown in Fig. 6, of which the amplifier of Fig. 5 is an alternative design, is disclosed and claimed in the allowed application of K. D. Swartzel, Jr. Summing Amplifier, filed May 1 1941, Serial No. 391,331, now patent 2,401,779, June 11, 1946, and assigned to the same assignee as the present invention. The voltage at the control grid of tube 58 is delivered to load 66 with reversed sign and with a scale factor determined as in the circuit of Fig. 5. Voltage sources A, B and C are connected through individual resistors to the control grid of tube 58. It may be shown, as is done in the patent above referred to, that the voltage at the control grid of tube 58 is proportional to the sum of the voltages of sources A, B and C divided individually by the resistances of resistors 64A, 64B and 64C, respectively. If these resistances are equal, the output voltage across load 66 is proportional to the sum of voltages of sources A, B and C; if the resistance of resistor 64A is twice that of each of the other input resistors, the output voltage is proportional to the sum of the voltages of sources B and C and one-half that of source A. The summing amplifier of Fig. 6 may be used for division as explained in connection with the description of Fig. 5.

Figure 7A:
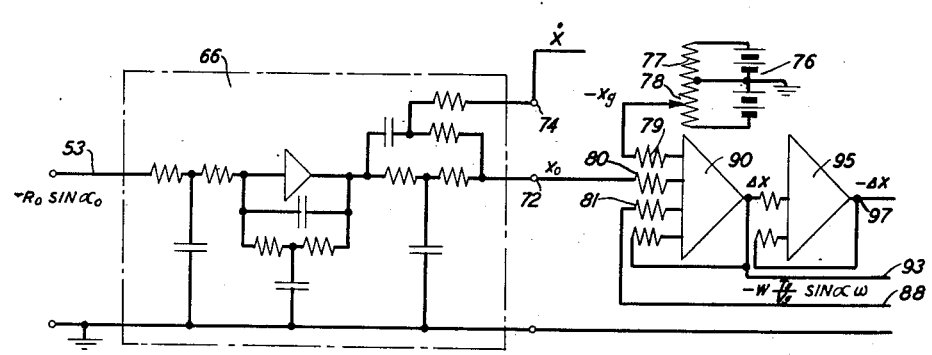
Figs. 7A and 7B are diagrams of the circuit for deriving from the circuit of Fig. 4 voltages representing the east-west and north-south components of the ground distance $R_1$ of Fig. 3, together with the corresponding components of the ground speed of the plane.
Figure 7B:
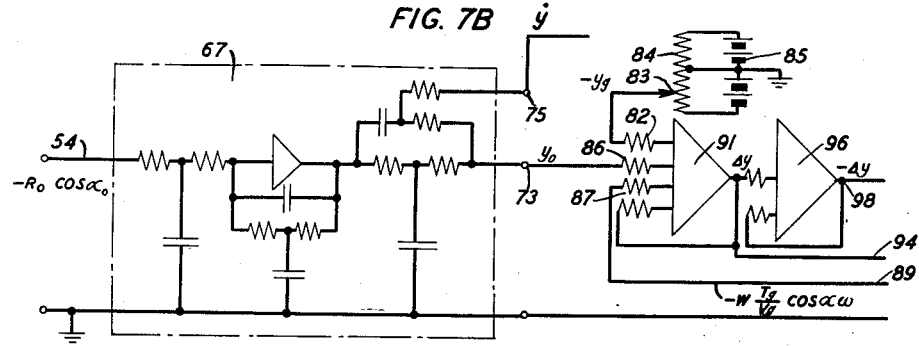

Figs. 7A and 7B are diagrams of the circuits whereby are derived smoothed values of present position and rates of change of the coordinates $x_0$, $y_0$ of point S, and also values of the $x$ and $y$ components of the distance $R_1$, Fig. 3. From Fig. 4, conductors 53 and 54 apply their respective voltages $-R_0 \sin \alpha_0$ and $-R_0 \cos \alpha_0$ to the inputs of smoothing networks 66 and 67. These networks, the design of which is not a part of the present invention provide at output terminals 72 and 73 voltages representing smoothed values of $x_0$ and $y_0$, respectively, cleared of tracking errors in the operation of the range finder and corrected for the network delay to represent in magnitude the actual coordinates of the plane position from moment to moment. Also, at terminals 74 and 75 are voltages corresponding to the smoothed rates of change of $x$ and $y$ coordinates of the point S; as the plane moves with constant speed in these coordinates, no delay correction is needed for the rate voltages.

To obtain voltages representing $\Delta_x$ and $\Delta_y$, Fig. 3, in Fig. 7A $x_0$ is combined with $-x_g$, the $x$ coordinate of the target, and with a correction term $$-W\frac{T_g}{V_g}\sin \alpha_\omega$$

furnished by the circuit of Fig. 8, later described. A direct current source of voltage 76 grounded at its midpoint is shunted by potentiometer 77, on which tap 78 is handset to apply to summing amplifier 90 through resistor 79 a voltage $-x_g$ in accordance with the map position of the target G. The voltage $x_0$ is applied through resistor 80 from terminal 72 and through resistor 81 is taken the correction term $$-W\frac{T_g}{V_g}\sin \alpha_\omega$$

the $x$ coordinate of the ground aimpoint A' relative to G.

Similarly, in Fig. 7B summing amplifier 91 receives $-y_g$, the target $y$ coordinate from the map, through resistor 82 from tap 83 on potentiometer 84 shunting a direct current source of voltage 85 which may be identical with source 76. Amplifier 91 receives through resistors 86 and 87, respectively, $y_0$ from terminal 73 and the correction term $$-W\frac{T_g}{V_g}\cos \alpha_\omega$$

the $y$ coordinate of aimpoint A' relative to G. The correction terms mentioned are applied via conductors 88 and 89, respectively, from the circuit of Fig. 8.

The output voltages of amplifiers 90 and 91 are thus respectively $$\Delta x = x_g - x_0 + W\frac{T_g}{V_g}\sin \alpha_\omega$$

and $$\Delta y = y_g - y_0 + W\frac{T_g}{V_g}\cos \alpha_\omega$$

inasmuch as the polarities of the summed voltages are reversed from those of their constituent inputs. Voltages $\Delta_x$ and $\Delta_y$ are available via conductors 93 and 94, respectively, and are reversed by amplifiers 95 and 96 to provide on conductors 97 and 98 voltages $-\Delta_x$ and $-\Delta_y$. These components of $R_1$ are used in the circuit of Fig. 8 for the servo computation of $R_1$ and $\alpha$, and the rates of change $\dot{x}$ and $\dot{y}$ are in the circuit of Fig. 9 used to compute $\alpha_g$ and $V_g$, the present ground course and speed of the attacking airplane.

Figure 8:
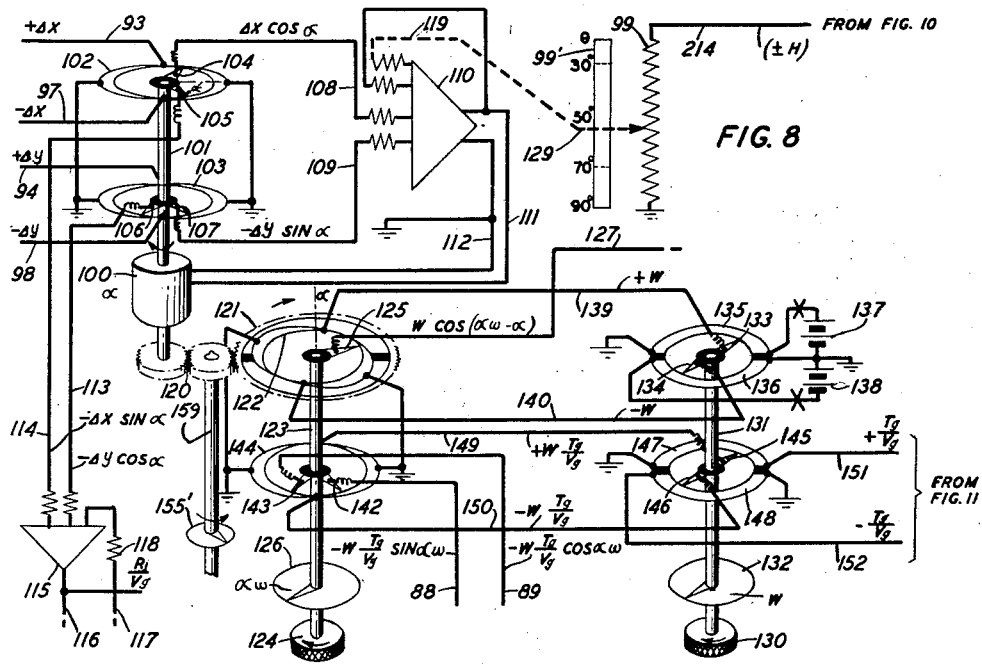
Fig. 8 shows a circuit for continuously computing the bearing of the line $SA'$ of Fig. 3 and a voltage proportional to the distance $R_1$ of Fig. 3.

Referring now to Fig. 8, servomotor 100 drives its shaft 101 to an angular position $\alpha$, the azimuth of the correct bombing track from S to A', Fig. 3. Potentiometers 102 and 103 are constructed similarly to potentiometer 19, Fig. 4, and are mounted concentrically with shaft 101. On each of potentiometers 102 and 103, the diameter joining the points on the winding of greatest resistance per turn is taken as the zero of $\alpha$, and these points are grounded. At right angles to this grounding diameter on potentiometer 102 are connected as shown conductors 93, $+\Delta x$, and 97, $-\Delta x$. Similarly on potentiometer 103 are connected conductors 94 and 98, $+\Delta y$ and $-\Delta y$, respectively.

Brushes 104 and 105 are mounted, with suitable insulation, at right angles to each other on shaft 101, the rotation of which enables these brushes to sweep over the winding of potentiometer 102 and select therefrom voltages $\Delta x \cos \alpha$ by brush 104 and $-\Delta x \sin \alpha$ by brush 105. Similarly carried by shaft 101 are brushes 106 and 107 which takes from potentiometer 103 the voltages $-\Delta y \cos \alpha$ and $-\Delta y \sin \alpha$, respectively. The voltages $\Delta x \cos \alpha$, via conductor 108, and $-\Delta y \sin \alpha$, via conductor 109, are inputs to amplifier 110, which is a summing amplifier such as that shown in Fig. 6. The output voltage of amplifier 110 on conductors 111 and 112 drives motor 100 to an angular position $\alpha$ where the total input voltage to amplifier 110 is zero: $\Delta x \cos \alpha - \Delta y \sin \alpha = 0$.

Conductor 119, shown dashed in Fig. 8, provides from tap 129 on linear potentiometer 99 the voltage $\pm H \cos \theta$, where $\theta$ is the drive angle, required for the dive bombing solution. Voltage $\pm H$ is obtained via conductor 214, Fig. 10. Tap 129 is set by hand with reference to scale 99', suitably graduated.

Voltages $-\Delta x \sin \alpha$ on conductor 114 and $-\Delta y \cos \alpha$ on conductor 113 are applied as inputs to summing amplifier 115 of which the iutput voltage would be (for these inputs alone $R_1 = \Delta x \sin \alpha + \Delta y \cos \alpha$. The output of amplifier 115 is applied via conductor 116 across a potentiometer 190 (shown in Fig. 9) on which brush 189 is connected by conductor 117 to feedback resistor 118. The output voltage across potentiometer 190 becomes $$R_1\left(\frac{r_1 r_3}{r_2 r_4}\right)$$

where $r_1$ is the resistance of resistor 118; $r_2$ that of the undesignated input resistors in lines 113, 114; $r_3$ the resistance of potentiometer 190; and $r_4$ the portion of $r_3$ included between ground and brush 189. If $r_1$ and $r_2$ are equal, the voltage at brush 189 becomes $$R_1\left(\frac{r_3 r_4}{r_4 r_3}\right) = R_1$$

while the output voltage on conductor 116 is proportional to $R_1$ divided by the quantity represented by the resistance $r_4$. As explained in connection with Fig. 9, this quantity is the ground speed $V_g$, so that the voltage output of amplifier 115 is made proportional to $$\frac{R_1}{V_g}$$

The circuit operation above described is explained in detail in United States Patent 2,432,504, December 16, 1947, to W. H. Boghosian et al.

At the same time, shaft 101 through an extension driving gear 120, rotates gear 121 carrying sinusoidal potentiometer 122 which is thereby rotated through the angle $\alpha$ from an initial setting arbitrarily chosen, and in the same sense as the rotation of shaft 101. Concentric with gear 121 and potentiometer 122 is shaft 123 positioned by handset knob 124 to place brush 125 on potentiometer 122 (like potentiometer 103) at the angle $\alpha_\omega$, the azimuth from which the wind blows, with respect to the zero of the angle $\alpha$. $\alpha_\omega$ is read on dial 126. Accordingly, conductor 127 takes from brush 125 a voltage $W \cos(\alpha_\omega - \alpha)$, where a voltage W represents the wind speed and is applied as $+W$ and $-W$ respectively to points across the diameter of potentiometer 122 at right angles to the grounded diameter thereof. Via conductor 127 the voltage $W \cos(\alpha_\omega - \alpha)$ is combined in the circuit of Fig. 9 with the computed ground speed $V_g$ to provide a voltage $V_a = V_g + W \cos(\alpha_\omega - \alpha)$, a practically good approximation to the exact equation $V_a = [V_g^2 + W^2 + 2V_g W \cos(\alpha_\omega - \alpha_g)]^{1/2}$ neglecting $W^2$ in comparison with $V_g^2$ and assuming $\cos(\alpha_\omega - \alpha_g)$ nearly equal to $\cos(\alpha_\omega - \alpha)$.

Wind speed W is also known in advance and is set by knob 130 to position shaft 131, W being read on dial 132. Shaft 131 carries, with insulation, a pair of brushes 133 and 134. These are provided to sweep over semicircular potentiometers 135 and 136, respectively, which are in shunt individually with batteries 137 and 138, whereby the winding of potentiometer 122 is at one diametral point supplied with a voltage $+W$ via conductor 139 from brush 133 and at the opposite diametral point is supplied with voltage $-W$ via conductor 140 from brush 134; the points of connection to potentiometer 122 are those where the winding has substantially zero resistance per turn. At points 90 degrees from these, the winding is grounded.

Knob 124 also positions to the angle $\alpha_\omega$ brushes 142 and 143 on sinusoidal potentiometer 144. Knob 130 also positions brushes 145 and 146 on semicircular linear potentiometers 147 and 148, respectively similar to potentiometers 135 and 136, whereby positive and negative fractional voltages proportional to the wind speed W are applied via conductors 149 and 150, respectively, across potentiometer 144. Brushes 142 and 143 then select respectively sine and cosine fractions of the fractional voltages on conductors 149 and 150, the sine fraction being taken by conductor 88 to the input of amplifier 90, Fig. 7A, while conductor 89 applies the cosine fraction to the input of amplifier 91, Fig. 7B.

The voltages fractionated by brushes 145 and 146 are $$\frac{T_g}{V_g} \text{ and } -\frac{T_g}{V_g}$$

on conductors 151 and 152 as shown. These are derived in the circuit of Fig. 11, later described. The voltages $$-W\frac{T_g}{V_g}$$

$\sin \alpha_\omega$ on conductor 88 and $$-W\frac{T_g}{V_g} \cos \alpha_\omega$$

on conductor 89 are terms in the expression for $\Delta x$ and $\Delta y$, respectively. W and $\alpha_\omega$ are set by hand, as above stated, $V_g$ is computed by the circuit of Fig. 9, next described, and $$\frac{T_g}{V_g}$$

is computed by the circuit of Fig. 11 as a function of H and of $V_a$, plane bombing height and airspeed, respectively:

$$\frac{T_g}{V_g}$$

equals approximately $f_1(H + V_a f_2(H))$.

Figure 9:
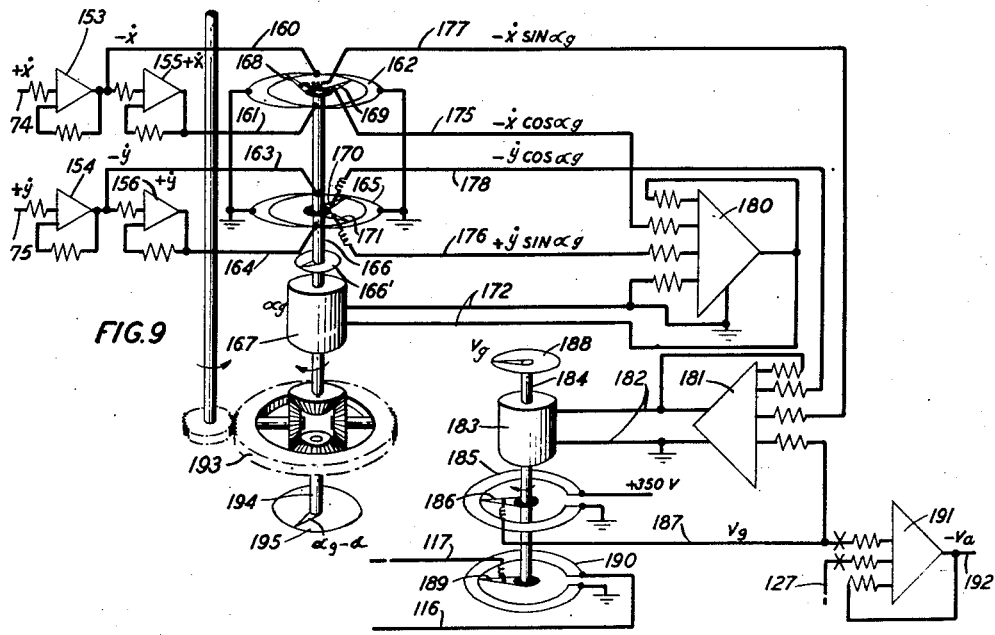
Fig. 9 shows a circuit for continuously computing the ground course and speed of the airplane of Figs. 1 and 2 and the angular difference between this course and the bearing of the line $SA'$.

The angle $\alpha$ determined as the angular position of shaft 101, is repeated through gears 120 as the angular position of shaft 159, continued in connection with the circuit of Fig. 9 to define the required change in ground course from $\alpha_g$ to $\alpha$. A pointer carried on shaft 159 indicates $\alpha$ on dial 155'.

Referring now to Fig. 9, voltages $\dot{x}$ and $\dot{y}$ are conveyed by conductors 74 and 75, respectively, to polarity reversing amplifiers 153 and 154, succeeded each by another such amplifier 155 and 156, respectively. Voltages $+\dot{x}$ and $-\dot{x}$ are applied by conductors 161 and 160 across sinusoidal potentiometer 162, while voltages $+\dot{y}$ and $-\dot{y}$ are similarly applied via conductors 164 and 163 across a like potentiometer 165. Potentiometers 162 and 165 are both circular cards concentric with shaft 166 driven by servomotor 167. Carried with but insulated from shaft 166 are brushes 168 and 169 sweeping potentiometer 162 and brushes 170 and 171 sweeping potentiometer 165.

To summing amplifier 180, brushes 169 and 171 supply via conductors 175 and 176 input voltages respectively proportional to $-\dot{x}$ times the cosine of the angle of rotation of shaft 166 from a reference position and to $+\dot{y}$ times the sine of that angle. The output voltage of amplifier 180 is through conductors 172 applied to control servomotor 167. Since $\dot{y} \sin \alpha_g = \dot{x} \cos \alpha_g$, motor 167 positions shaft 166 to $\alpha_g$, the actual ground course of the plane over S, Fig. 3. At the same, conductors 177 and 178 supply voltages $-\dot{x} \sin \alpha_g$ and $-\dot{y} \cos \alpha_g$ to summing amplifier 181 of which the output voltage by conductors 182 is applied to control servomotor 183. Motor 183 therefore drives shaft 184 to a position where the combined negative voltage inputs from conductors 177 and 178 are balanced by the positive voltage $V_g$ derived by brush 186 from linearly wound circular potentiometer card 185, across which is connected a suitable voltage as, for example, +350 volts to ground. Conductor 187 supplies the voltage from brush 186 to the input of amplifier 181. Shaft 184 carries at its upper end a pointer to indicate on dial 188 the quantity $V_g$, the ground of the plane on the course $\alpha_g$ indicated on dial 166' by a pointer carried by shaft 166.

At its lower end, shaft 184 carries a brush 189 traversing circular potentiometer 190 of which the linear winding is grounded at one end and connected at its other end by conductor 116 to the output of amplifier 115, Fig. 8. Brush 189 is connected by conductor 117 to feedback resistor 118 of amplifier 115, Fig. 8. As previously explained, amplifier 115 whereby provides an output voltage on conductor 116 proportional to the sum with reversed sign of the input voltages $-\Delta x \sin \alpha$ and $-\Delta y \cos \alpha$ divided by $V_g$, that is $$\frac{R_1}{V_g}$$

a voltage used in computing the time $t_r$ to go from the point S to the release point P, Fig. 3.

The voltage $V_g$ on conductor 187 is summed with the voltage $W \cos (\alpha_w - \omega)$ on conductor 127, Fig. 8, by summing amplifier 191, of which the output voltage then represents $-V_a$ on conductor 192.

The desired ground course $\alpha$ and the actual ground course $\alpha_g$ are determined by servomotor 100, Fig. 8, and by servomotor 167, Fig. 9, respectively, and these courses must be compared to determine the change in ground course the plane is required to make. Shaft 159 of Fig. 8 is driven through gears 120 from motor shaft 101, and is continued to join the apparatus of Fig. 9 where its motion is subtracted from that of shaft 166 through differential gearing generally identified as 193. Output shaft 194 of differential 193 then assumes the angular position $\alpha_g - \alpha$, positive if the plane must turn left. This angle of required change of course is read on dial 195. It will be understood that the described arrangement of shaft 159, differential 193, shaft 167 and shaft 194 is illustrative only and may be replaced by a differential "selsyn" such as is described in United States Patent 1,628,463, granted May 10, 1927 to E. M. Hewlett et al., or by an equivalent means for indicating the relative angular motion of a number of shafts.

If it can be assumed, as is here done, that the plane's actual course is already close to the required course, the required change $\alpha_g - \alpha$ results in no significant change in $V_g$ if the plane's airspeed $V_a$ is constant.

In Figs. 8 and 9, the connections marked by crosses are opened by suitable switches when the dive bombing problem is to be solved.

The correction terms in $\Delta x$ and $\Delta y$, which are the $x$ and $y$ components of the distance A'G, Fig. 3, involve the factor $$\frac{T_g}{V_g} = \frac{T}{V_a}$$

This factor represents a time interval and is found to be conveniently expressed as $$\frac{T_g}{V_g} = f_1(H) + V_a f_2(H)$$

where the terms of the right-hand member are empirically established functions of the bombing altitude H.

The distance to go from S to the release circle at P is from Fig. 3, $R_1 - (V_g t - T_g)$ and the time over the path SP is this distance divided by $V_g$. That is, the time $t_r$ remaining before release is $$t_r = \frac{R_1}{V_g} + \frac{T_g}{V_g} - t$$

where $t$ is the time of bomb fall. It is found that $t$ is also expressible as $t = f_3(H)(1 + KV_a)$, where $f_3(H)$ and K are empirical. For $V_a$ in miles per hour, K is $5.7583 \times 10^{-5}$ for one type of bomb.

The functions $f_1$, $f_2$ and $f_3$ are not represented by simple algebraic expressions and vary, as does K, with the type of bomb.

$$\frac{T_g}{V_g}$$

is determinable in the apparatus of the invention by a circuit later described (Fig. 11) making use of the voltage $-V_a$ on conductor 192, Fig. 9. This voltage results from the summation of voltages representing $V_g$ on conductor 187, Fig. 9 and $W \cos (\alpha_w - \alpha)$ on conductor 127, Fig. 8; the expression $W \cos (\alpha_w - \alpha)$ is substantially identical with the exact form $W \cos (\alpha_w - \alpha_g)$, since $\alpha$ and $\alpha_g$ are in practice not greatly different. By the circuit of Fig. 11 voltages $$\frac{T_g}{V_g} \text{ and } -\frac{T_g}{V_g}$$

are provided via conductors 151 and 152, Fig. 8, and as described in connection with Fig. 8 are used to determine the $x$ and $y$ components of A'G which respectively appear on conductor 88, Fig. 7A, and on conductor 89, Fig. 7B, contributing to the computation of $\Delta x$ and $\Delta y$, respectively. It will be recognized that the operation of motor 100, Fig. 8, is stable for the reason that as shaft 101 turns to approach the rest position $\alpha$, the correction terms approach the correct values.

Figure 10:
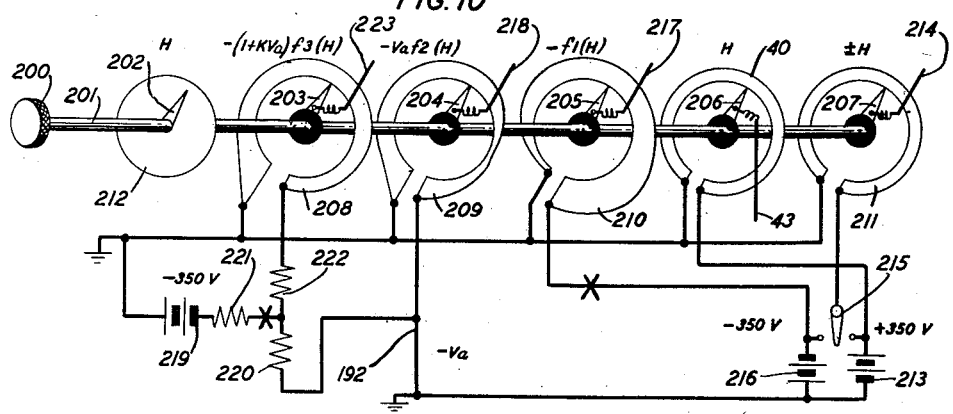
Fig. 10 illustrates an arrangement of potentiometers from which are obtained certain functions of the difference in elevation of the airplane and the target to be attacked.

Fig. 10 shows the potentiometer arrangement whereby are derived voltages representing $-f_1(H)$, $-V_a f_2(H)$, $-(1+KV_a)f_3(H)$, as well as H and ±H. Handset knob 200 positions shaft 201, on which are carried pointer 202 and insulated brushes 203 to 207. These brushes respectively sweep over circular potentiometer cards 208, 209, 210, 40 and 211, while the position of pointer 202 is read on dial 212.

Battery 213, +350 volts, is permanently connected across the linear winding of potentiometer 40; the latter is the like numbered potentiometer shown developed in Fig. 4 and on it brush 206 is so placed by operating knob 200 that conductor 43 derives the positive voltage required to be supplied to amplifier 37, Fig. 4, a voltage there explained as representing the bombing height H, which is then read on dial 212.

On potentiometer 211, like potentiometer 40, brush 207 derives for conductor 214 an equal H voltage, positive or negative as switch 215 is closed right to battery 213 or left to battery 216, −350 volts. This H voltage is used in solving the problem of dive bombing and is discussed later.

Negative battery 216 is connected, in high level bombing, across potentiometer 210. The cross indicates disconnection of battery 216 in dive bombing. Then, in high level bombing, conductor 217 has from brush 205 the voltage $-f_1(H)$.

Potentiometer 209 is supplied with voltage $-V_a$ on conductor 192, Fig. 9, and brush 204 then provides on conductor 218 the voltage $-V_a f_2(H)$.

Finally the voltage $-V_a$ cooperates with that of negative 350-volt battery 219 in high level bombing. These voltages, through resistors 220 and 221, respectively furnish currents through resistor 222 and the winding of potentiometer 208. The resistances of resistors 220 to 222 are each chosen in such relation to that of potentiometer 208 that the voltage across the latter is proportional to $-(1+KV_a)$, wherefore by brush 203 the voltage $-f_3(H)(1+KV_a)$ is made available on conductor 223.

The windings of potentiometers 208, 209 and 210 have resistances per turn varying with angular distance from the grounded points in accordance with empirical data, and in each case the form of the card is only rudely indicated in Fig. 10.

Fig. 11 is a diagram of the circuit elements concerned in computing the time $t_r$ remaining for flight to the release point and in computing $$\frac{T_g}{V_g}$$

Conductor 116 transmits from the circuit of Fig. 8 the voltage $$\frac{R_1}{V_g}$$

to the input of summing amplifier 230 where it is summed with the voltage $-f_3(H) (1+KV_a)=-t$ on conductor 223 from the circuit of Fig. 10 and with the voltage $$\frac{T_g}{V_g}$$

on conductor 151', the last voltage being one used also in the circuit of Fig. 8. For the dive bombing work, conductors 223 and 151' are disconnected as indicated by the crosses in Fig. 11.

The output voltage of amplifier 230 is thus representative of $$t_r = \frac{R_1}{V_g} + \frac{T_g}{V_g} - t$$

with reversal of sign, and is smoothed by the smoother circuit indicated generally by numerical 231 to provide on conductor 232 a voltage free from errors of tracking which is read on meter 233. The voltage $-t_r$ is by conductor 232' also transmitted to a relay circuit, not shown, which may be of any suitable character adapted to transmit desired timing signals to the pilot of the plane commencing, for example, at a chosen interval before $t_r$ drops to zero.

The voltages $$\frac{T_g}{V_g} \text{ and } -\frac{T_g}{V_g}$$

are derived by the circuit arrangement shown below in Fig. 11. From the circuit of Fig. 10, the voltage components of $$-\frac{T_g}{V_g} = -f_1(H) - V_a f_2(H)$$

are obtained via conductors 217 and 218 and applied to the input of summing amplifier 240, the output voltage of which is thus $$+\frac{T_g}{V_g}$$

on conductor 151. Amplifier 240 is succeeded by polarity reversing amplifier 250 from which the output voltage $$-\frac{T_g}{V_g}$$

appears on conductor 152. As previously explained, the voltages on conductors 151 and 152 are used in the circuit of Fig. 8 to compute the $x$ and $y$ components of the distance A'G, Fig. 3, from ground aim point A' to target position G.

The system of apparatus explained in the foregoing description thus completely solves the problem of high level bombing of a target which may be unobservable optically or electrically from the bombing plane. From information furnished in following the plane by the range finding apparatus, optical or electrical, together with a map on which the positions of ground observer and of target are known in surface and altitude relation to each other and with a prior knowledge of the existing wind, the apparatus of the invention is used by the ground observer to compute automatically the actual ground course and speed of the attacking plane, the change of course required and the time remaining before the moment of bomb release.

There is now to be described the use of the invention in solving the problem of attack by a plane diving to bomb the target. The geometry of the dive bombing problem will first be explained.

In Fig. 12, points O, S, and G as in Fig. 3, respectively represent the map positions of the observer, of the plane at the time computation begins and of the target. In dive bombing, it is customary to direct the attacking plane on a ground course tangent to a circle of radius $P_dA_1$, centered about a point $A_1$, upwind from the target by the distance $Wt_d$, where $t_d$ is the estimated time of dive from the height H and W is, as before, the wind speed. Wind direction, plane courses observed and required, and plane ground speed are identified as in Fig. 3. $R_1$ in Fig. 12 is the distance to go from S to the point of starting the dive.

The dive circle is of radius $D=H \cot \theta$, where $\theta$ is the angle of dive down from the horizontal. This angle is known in advance, as is also the direction right or left in which the dive is to be made. In the figure, "$R_1$(Right)" is the ground track from S to the point $P_d$ over which dive to the right begins. It is required to compute $R_1$, the ground course $\alpha$ and the time $t_r$ remaining for the plane to cover the distance $R_1$.

From Fig. 12, it is obvious that $R_1 = \Delta x \sin \alpha + \Delta y \cos \alpha$, where $\Delta x = x_g - x_0 + W t_d \sin \alpha_w$ and $\Delta y = y_g - y_0 + W t_d \cos \alpha_w$. Also that, in the case of diving to the right as shown, $$\Delta x \cos \alpha - H \cot \theta = \Delta y \sin \alpha \text{ and } t_r = \frac{R_1}{V_g}$$

The circuits shown in Figs. 8, 9, 10 and 11 are readily modified for the solution of the dive problem as follows:

In Fig. 8, batteries 137 and 138 are disconnected since the airspeed $V_a$ is not required, and connection is made from tap 129 on potentiometer 99 to the input of amplifier 110 as indicated by the dashed line. To supply the voltage $-H$ to potentiometer 99, switch 215 in Fig. 10 is operated to apply battery 216 across potentiometer 211. Motor 100 then moves so to position shaft 101 that the sum of input voltages to amplifier 110 shall be zero, $\Delta x \cos \alpha - H \cot \theta - \Delta y \sin \alpha = 0$, thereby determining the required course $\alpha$ from S to $P_d$, Fig. 12.

For the computation of $\alpha_g$, no circuit change is required and the pointer on dial 195, Fig. 9 reads the angle $\alpha_g - \alpha$ through which the plane must be directed to change course. Since $V_a$ is not required, the voltage inputs to amplifier 191 shown in Fig. 9 are removed by disconnecting therefrom the conductors 127 and 187.

The voltages $+t_d$ and $-t_d$ are applied across potentiometer 148, Fig. 8, in place of $$+\frac{T_g}{V_g} \text{ and } -\frac{T_g}{V_g}$$

on conductors 151 and 152, respectively. The latter pair of voltages is removed by disconnecting battery 216 from potentiometer 210, Fig. 10, whereby amplifier 240, Fig. 11, no longer receives the input voltages $-V_a f_2(H)$ and $-f_1(H)$, the former being absent since $-V_a$ is, as just explained, no longer provided from amplifier 191 of Fig. 9. To obtain the $t_d$ voltages, connection is made by conductors 241 to potentiometer 242, as shown by the dashed line in Fig. 11. This results in replacing $$-W\frac{T_g}{V_g} \sin \alpha_w \text{ by } -W t_d \sin \alpha_w$$

on conductor 88, and $$-W\frac{T_g}{V_g} \cos \alpha_w \text{ by } -W t_d \cos \alpha_w$$

on conductor 89, Figs. 7A and 7B, respectively. Conductors 97 and 98 in those figures then transmit the $-\Delta x$ and $-\Delta y$ appropriate for the computation of $R_1$ and $\alpha$ for dive bombing.

Disconnecting from amplifier 230, Fig. 11, the conductors 223 and 151' leaves the input voltage to this amplifier simply $$\frac{R_1}{V_g}$$

or $t_r$ as the time to go from S to $P_d$, Fig. 12.

The conductors involved in the change from solving the problem of high level bombing to solving that of dive bombing are physically so disposed that the connections and disconnections above listed may be made simultaneously by operating a four-position multicontact switch, schematically shown in Fig. 13.

When meter 233 reads zero, indicating that the plane has reached the point of tangency $P_d$, the pilot is told to dive and the apparatus is free to solve the next problem.

When the purpose of the computation is to guide the plane with reference to a point at a known distance from the subplanar point at the start of computing, the apparatus is arranged for the dive bombing solution and conductors 119, Fig. 8, and 241, Fig. 11, are disconnected. The effect is to set to zero the time of dive and the radius of the dive circle; the result is to guide the plane directly over the point G. To guide the plane tangent to a circle of desired radius D' with G as center, conductor 241 is disconnected and tap 129 is set on potentiometer 99 Fig. 8 at an angle $\theta'$ where H cot $\theta'=D'$.

Fig. 13 shows in position 1 conversion switch 260 by operating which are effected the disconnections and connections listed in the foregoing. In its first position switch 260 makes eight connections, namely, those marked with crosses in Figs. 8 to 11, inclusive, as required for high level bombing, leaving unmade the dashed connections shown in those figures.

In positions 2, switch 260 opens the circuits of Figs. 8 to 11, inclusive, at the places marked with crosses, and closes the connections indicated in Figs. 8 and 10 by dashed lines as those required in dive bombing.

In its third position, switch 260 leaves open the connections opened in the second switch position and in addition opens those made in that position. This is the circuit situation suited to guide the plane directly over the point G. Position 3 may be called the "guide over" position.

Finally, in its fourth position switch 260 reestablishes the connection from tap 119 to the input of amplifier 110, Fig. 8, thereby placing the circuit in appropriate condition to guide the plane to pass the point G horizontally abeam by the desired distance $D'=H$ cot $\theta'$; wherefore position 4 may be called the "guide past" position.

In Fig. 13 the reference numerals shown indicate the elements from and to which connections are made by the several contact bars, and the figures concerned are identified by numbers aligned with the several pairs of contact terminals.

It is obvious from the construction shown in Fig. 12 that for a dive to the left from the point of tangency $P_d'$, it is only necessary to move switch 215, Fig. 10, to connect positive battery 213 across potentiometer 211. In this case, if $\alpha'$ is the course required to fly the path $R_1$ (left), $\Delta y$ sin $\alpha'=\Delta x$ cos $\alpha'+H$ cot $\theta$, while the distance from S to the point of tangency is again $R_1=\Delta x$ sin $\alpha'+\Delta y$ cos $\alpha'$, the same in form as in the case of diving to the right.

It is to be understood that the above-described arrangements are illustrative of the application of the principles of the invention. Numerous other arrangements may be devised by those skilled in the art without departing from the spirit and scope of the invention.

What is claimed is:

1. In a system of apparatus enabling an observer to guide a vessel to a destination at known horizontal distances north-south and east-west of his own position, the observer being provided with means for communicating with the vessel and means for continuously observing the horizontal north-south and east-west distances of the vessel's present position from his own position, computing means for ascertaining the change of course required of the vessel to reach the destination comprising means controlled by the observing means for establishing a first, a second, a third and a fourth voltage proportional respectively to the known north-south and east-west distances and to the like-named observed distances, means for simultaneously deriving from the first and third voltages a fifth voltage proportional to the north-south distance from the present position to the destination and from the second and fourth voltages a sixth voltage proportional to the east-west distance from the present position to the destination, means for differentiating with respect to time the third and the fourth voltages to derive therefrom respectively a seventh and an eighth voltage proportional respectively to the north-south and east-west components of the vessel's ground speed, means including a first and a second servomotor means responsive to the seventh and eighth voltages respectively to provide a ninth voltage proportional to the resultant of said speed components and to indicate as a first angle that between the resultant and the north-south speed component, whereby the ninth voltage is representative of the vessel's ground speed and the first angle is the compass direction of the vessel's present course, means including a third servomotor means responsive to the fifth and sixth voltages to provide a tenth and an eleventh voltage proportional to complementary segments, respectively, of the ground distance from the present position to the destination and to indicate as a second angle that between the last-named distance and the north-south component thereof, whereby the second angle defines as the required course the compass direction of the destination from the present position, and means continuously responsive to the second and the third servomotor means for obtaining the angular difference between the indicated angles and means for indicating said difference as the required change of course.

2. Computing means as in claim 1 comprising means controlled jointly by the first and the third servomotor means to sum the tenth and eleventh voltages and to derive from said sum a twelfth voltage proportional to said sum divided by the ninth voltage, thereby making the twelfth voltage representative of the time required for the vessel to reach the destination on the required course defined by the second angle.

3. A system of apparatus for computing the ground speed and course east of north of an airplane in level flight under observation by a ground observer provided with means for continuously observing the movement of the airplane in slant range, elevation and bearing relative to the observer's position, comprising in combination means jointly controlled by the slant range and elevation observing means for establishing a first and a second voltage respectively proportional to the vertical and horizontal components of the slant range, a first means controlled by the slant range observing means for establishing a first correcting voltage proportional to the square of the slant range, means for establishing a corrected first voltage numerically equal to the sum of the first voltage and the first correcting voltage divided by the diameter of the earth, a second means controlled by the slant range observing means for deriving from the corrected first voltage a second correcting voltage proportional to the product of the corrected first voltage and the slant range, means for deriving a corrected second voltage numerically equal to the sum of the second voltage and the second correcting voltage divided by the radius of the earth, whereby the corrected first and second voltages are approximately proportional respectively to the true altitude of the airplane and to the true distance on the earth's surface from the observer to the subplanar point vertically beneath the airplane, means controlled by the bearing-observing means for continuously deriving from the corrected second voltage a third and a fourth voltage respectively approximately proportional to the north-south and to the east-west components of the true distance, electrical differentiators responsive to said third and fourth voltages to derive therefrom respectively a fifth and a sixth voltage individually proportional to the time rates of change of the north-south and east-west components and thus to the like components of the airplane's ground speed, means including servomotor means responsive to the fifth and sixth voltages for simultaneously defining an angle $\alpha_g$ according to the equation $\dot{y} \sin \alpha_g = \dot{x} \cos \alpha_g$, wherein $\dot{y}$ and $\dot{x}$ represent the magnitudes of the fifth and sixth voltages, respectively, and establishing a seventh voltage of magnitude proportional to $\dot{y} \cos \alpha_g + \dot{x} \sin \alpha_g$, whereby the seventh voltage is proportional to the ground speed and the angle $\alpha_g$ is the bearing thereof east of north, and means for indicating the values of the seventh voltage and of the defined angle.

4. For determining from an observer's position complementary segments of the ground distance and the course east of north required for a vessel to pass tangent to a circle of chosen radius D about a chosen point at known distances north-south and east-west of the observer's position, said distances and radius being represented by voltages individually proportional thereto, where D is considered positive for passage to the left of the chosen point and negative for passage to the right thereof, the observer being provided with means for continuously observing the present position of the vessel in range and bearing from his own position, a computing system comprising, in combination, means controlled by the observing means for establishing voltages proportional to the present distances north-south and east-west of the vessel from the observer's position, a first electrical means responsive to the voltages respectively proportional to the known and the present north-south distances to derive a first difference voltage proportional to the algebraic difference $\Delta y$ of said north-south distances, a second electrical means responsive to the voltages respectively proportional to the known and the present east-west distances to derive a second difference voltage proportional to the algebraic difference $\Delta x$ of said east-west distances, whereby the first and second difference voltages are respectively proportional to the north-south and east-west distances of the chosen point from the vessel's present position, computing means including servomotor means responsive to said difference voltages and to the voltage representative of D simultaneously to define an angle $\alpha$ such that $\Delta x \cos \alpha - D = \Delta y \sin \alpha$ and to provide voltages proportional respectively to $\Delta x \sin \alpha$ and $\Delta y \cos \alpha$ and so to complementary segments of the ground distance from the present position to the point of tangency, thereby determining $\alpha$ as the angle between the north-south direction and the direction from the vessel's present position to the point of tangency of the course and the circle and means driven by said servomotor means for indicating the angle $\alpha$ and means connected to said computing means for summing the last-named proportional voltages to produce a voltage proportional to the ground distance from the present position to the point of tangency.

5. A computing system as in claim 4 including electrical differentiating means for deriving from the voltages proportional to the present distances derivative voltages proportional to the time rates of change of the present distances, means including a second servomotor means responsive to the derivative voltages for establishing a voltage proportional to the resultant of said rates of change and so to the ground speed of the vessel and for defining an angle $\alpha_g$ in accordance with the equation $\dot{y} \sin \alpha_g = \dot{x} \cos \alpha_g$, wherein $\dot{y}$ and $\dot{x}$ are proportional respectively to the time rates of change of the north-south and of the east-west present distances and $\alpha_g$ is the angle of the resultant of said rates of change east of the north-south direction, means controlled jointly by the first and second servomotor means for comparing the angles $\alpha$ and $\alpha_g$, and means driven by said comparing means for indicating the angular difference between said angles.

6. A computing system as in claim 5 including electrical means responsive jointly to the summing means and the second servomotor means to derive a final voltage proportional to the quotient of the summed voltages and the ground speed voltage, whereby the final voltage is proportional to the time required to reach the point of tangency, and means connected to said responsive electrical means for indicating the value of the final voltage.

7. In a system of apparatus including means for observing the slant range and angle of elevation of an object relative to an observer on the earth's surface, means for providing voltages approximately proportional respectively to the height of the object above the earth's surface and to the great circle distance on that surface from the observer to the surface point vertically beneath the object comprising a source of voltage, means for deriving from the source a first voltage proportional to the slant range, means for deriving from the first voltage a second and a third voltage proportional respectively to the vertical and horizontal components of the slant range, means for deriving from the first voltage a fourth voltage proportional to the square of the slant range, the first, second, third, and fourth voltages being of like polarity, a second source of voltage, means for deriving from the second source an adjustable fifth voltage of the opposite polarity, means including a first voltage-summing means for adjusting the fifth voltage to numerical equality with sum of the second voltage and the fourth voltage divided by a quantity proportional to the diameter of the earth thereby making the fifth voltage approximately proportional to the height of the object, means for deriving from the fifth voltage a sixth voltage proportional to the product of the height by the slant range and means including a second voltage-summing means for summing the third voltage with the sixth voltage divided by a quanity proportional to the radius of the earth thereby obtaining a sum voltage approximately proportional to the length of the great circle distance.

8. The method of computing the ground speed and course of an airplane in level flight under observation by a ground observer enabled continuously to observe the movement of the airplane in slant range, elevation and bearing relative to his own position comprising the steps of resolving the observed slant range into its horizontal and vertical components, approximately correcting the horizontal component for the curvature of the earth on the great circle arc connecting the observer's position with the earth position vertically beneath the airplane, resolving the corrected horizontal component into its north-south and east-west components, differentiating individually with respect to time and last-named components to obtain mutually perpendicular horizontal components of the ground speed of the observed airplane, and solving the right triangle of which the ground speed components are the legs to compute the direction and magnitude of their resultant, thereby computing the course and ground speed of the airplane.

References Cited in the file of this patent

UNITED STATES PATENTS

| 1,943,403 | Watson | Jan. 16, 1934 |
| 2,408,081 | Lovell et al. | Sept. 24, 1946 |
| 2,416,223 | Sanders | Feb. 18, 1947 |
| 2,432,504 | Boghosian et al. | Dec. 16, 1947 |